United States Patent [19]
McNeil et al.

[11] Patent Number: 6,070,430
[45] Date of Patent: Jun. 6, 2000

[54] SEPARATION OF CARBON MONOXIDE FROM NITROGEN-CONTAMINATED GASEOUS MIXTURES ALSO CONTAINING HYDROGEN

[75] Inventors: Brain Alfred McNeil, Chessington; Alan Geoffrey Truscott, Bieldside, both of United Kingdom

[73] Assignee: Air Products and Chemicals, Inc., Allentown, Pa.

[21] Appl. No.: 09/240,942

[22] Filed: Jan. 29, 1999

[30] Foreign Application Priority Data

Feb. 2, 1998 [GB] United Kingdom ................ 9802231

[51] Int. Cl.[7] ........................................ F25J 3/02
[52] U.S. Cl. ................................. 62/620; 62/920
[58] Field of Search .............. 62/620, 631, 920, 62/621

[56] References Cited

U.S. PATENT DOCUMENTS

| 4,217,759 | 8/1980 | Shenoy | 62/920 |
| 4,478,621 | 10/1984 | Fabian | 62/31 |
| 5,832,747 | 11/1998 | Bassett et al. | 62/630 |

FOREIGN PATENT DOCUMENTS 2297825  8/1996  United Kingdom ............... F25J 3/02

*Primary Examiner*—William Doerrler
*Attorney, Agent, or Firm*—Willard Jones, III

[57] ABSTRACT

Carbon monoxide is separated from a gaseous mixture containing hydrogen and carbon monoxide and contaminated with nitrogen by partially condensing the mixture to provide a hydrogen-enriched vapor feed fraction and a carbon monoxide-enriched liquid feed fraction; separating nitrogen from carbon monoxide in said liquid fraction in a distillation column to provide nitrogen-freed liquid carbon monoxide bottoms and nitrogen-enriched vapor overheads; condensing at least a portion of said overheads against a recycle heat pump stream derived from said gaseous mixture and containing hydrogen and carbon monoxide; and returning at least a portion of said condensed overheads to said nitrogen-separation column as reflux. The recycle heat pump stream usually is provided by condensation from the hydrogen-enriched vapor feed fraction and/or by separation from the carbon monoxide-enriched liquid feed fraction.

23 Claims, 1 Drawing Sheet

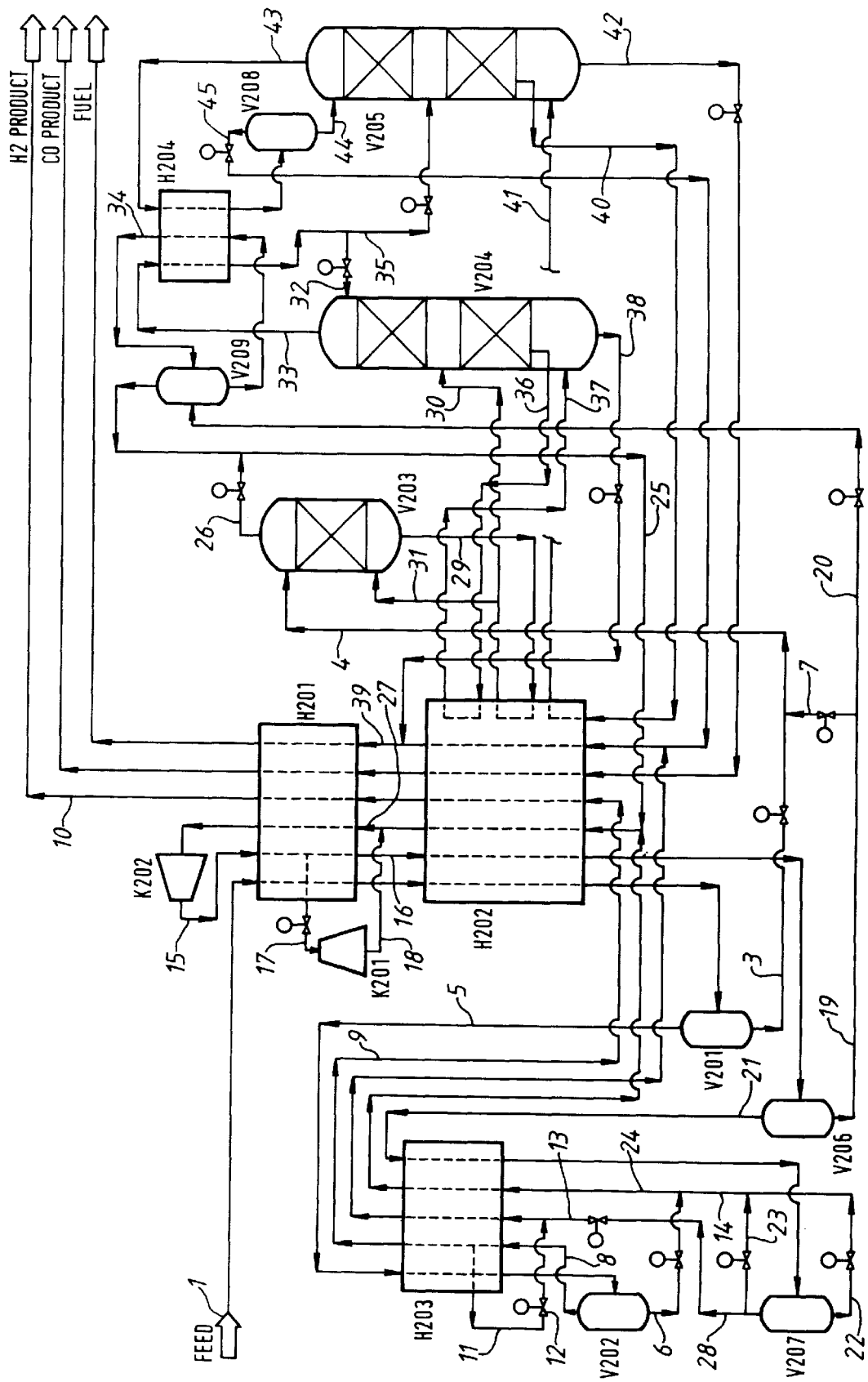

006,070,430

SEPARATION OF CARBON MONOXIDE FROM NITROGEN-CONTAMINATED GASEOUS MIXTURES ALSO CONTAINING HYDROGEN

TECHNICAL FIELD OF THE INVENTION

The present invention relates to the separation of carbon monoxide ("CO") from gaseous mixtures containing hydrogen, carbon monoxide and nitrogen. It has particular, but not exclusive, application to the separation of carbon monoxide from synthesis gas containing methane as well as hydrogen and carbon monoxide and contaminated with nitrogen.

BACKGROUND OF THE INVENTION

Carbon monoxide usually is obtained by separation from synthesis gases produced by catalytic conversion or partial oxidation of natural gas, oils or other hydrocarbon feedstock. In addition to carbon monoxide, these gases contain primarily hydrogen and methane but are often contaminated with significant amounts of nitrogen (derived from the feed or added during processing). Conventional cryogenic separation processing leaves nitrogen as an impurity in the carbon monoxide, which, for both environmental and processing reasons, is unacceptable for some uses of carbon monoxide. The problem of nitrogen contamination of carbon monoxide product is becoming an increasing problem with the usage of more marginal feed stock in front end reforming processes. Accordingly, there is a demand for efficient and effective removal of contaminant nitrogen from carbon monoxide product.

It has been proposed in U.S. Pat. No. 4,478,621 to overcome the problem by distilling nitrogen-contaminated carbon monoxide in a distillation column using nitrogen-freed carbon monoxide as a heat pump stream. In particular, nitrogen-freed carbon monoxide liquid bottoms is withdrawn and cooled by expansion; at least a portion of the expanded stream is used to cool the nitrogen-enriched overheads by indirect heat exchange; and a portion of the expanded stream is compressed and recycled to the column sump to provide reboil to the column.

In a first illustrated embodiment (FIG. 1) of U.S. Pat. No. 4,478,621, synthesis gas feed is partially condensed and the resultant two phase mixture fed to a wash column in which carbon monoxide is scrubbed from the vapor phase by contact with a liquid methane stream to provide CO-loaded methane containing some, typically 3–4%, hydrogen. A CO recycle heat pump stream provides intermediate indirect cooling to the wash column to remove the heat of solution of carbon monoxide in methane. Residual hydrogen is removed from the CO-loaded methane in a stripping column to meet the required carbon monoxide product specification. The hydrogen-stripped CO-loaded methane is separated into nitrogen-contaminated carbon monoxide overheads vapor and methane-rich bottoms liquid in a methane-separation fractionation column in which both overhears cooling and bottoms reboil is indirectly provided by the CO recycle heat pump stream. Nitrogen is removed from the carbon monoxide overheads in a nitrogen/CO fractionation column to provide CO product bottoms liquid. Overheads cooling to the nitrogen/CO fractionation column is indirectly provided by expanded CO product bottoms liquid and bottom reboil is directly provided by the CO recycle heat pump stream.

In a second illustrated embodiment (FIG. 2) of U.S. Pat. No. 4,478,621, synthesis gas feed of low methane content is fed into an open refrigerant cooling cycle derived from partial condensation of the resultant mixed feed. The mixed feed is compressed, partially condensed and then phase separated. The vapor phase from an initial phase separation is expanded to provide a hydrogen-rich product, a portion of which contributes to the refrigerant cooling cycle fluid. The liquid phase from the initial phase separation is degassed by expansion and subsequent phase separation. The expansion gas and a portion of the degassed liquid phase complete the refrigerant cooling cycle fluid. This fluid is warmed against process streams and added to the synthesis gas feed. The remainder of the degassed liquid is separated in a nitrogen/CO fractionation column to provide nitrogen-enriched overheads and CO product as bottoms liquid. As in the first embodiment, overheads cooling to the nitrogen/CO fractionation column is indirectly provided by expanded CO product bottoms liquid and bottom reboil is directly provided by a CO recycle heat pump stream.

The nitrogen-freed carbon monoxide liquid bottoms expansion usually has a pressure drop of only 1 to 2 Bar (100 to 200 kPa; 15 to 30 psi) because the stream is required to be subsequently warmed to ambient temperature to provide feed to the recycle compressor, which compressor feed should be slightly higher than atmospheric pressure. It is possible to use a compressor with a suction pressure below atmospheric pressure to increase the available pressure difference but this would significantly increase construction costs because of the need to provide protection for the compressor. The pressure difference available during expansion determines the extent of elevation of the liquid carbon monoxide level without the use of a pump. The difference can amount, for example, to about 12 metres at an expansion of 1 bar (100 kPa; 15 psi). If no additional pump is used, the maximum height of the distillation column is predetermined for each individual application.

It has been found that the limitation on the height of the distillation column without the use of a pump can be avoided by use, as a recycle heat pump stream, of a mixture of hydrogen and carbon monoxide obtained from the synthesis gas feed. This recycle stream can provide both reboiler and condenser duty to the nitrogen-separation column. The utilization of a single low pressure $H_2$/CO recycle system allows the nitrogen/carbon monoxide separation to be efficiently integrated into synthesis gas separation. Compared with the second embodiment of U.S. Pat. No. 4,478,621, the number of compressors required can be reduced (from two to one) because the presence of two separate heat pump cycles can be avoided.

GB-A-2297825 discloses the removal of nitrogen from a natural gas feed stream by a cryogenic distillation process in which the feed stream is separated in a distillation column to provide methane-rich bottoms liquid; nitrogen-rich overheads vapor and an intermediate vapor stream. The methane-rich bottoms liquid is recovered as a methane-rich product, preferably after being pumped to increase its pressure. The nitrogen-rich overhead vapor is warmed in heat exchange with the intermediate vapor stream to at least partially condense said stream for return to the distillation column to provide reflux. A portion of the warmed nitrogen-rich overhead vapor is utilized as a recycle nitrogen-rich heat pump stream above the critical pressure of nitrogen to provide at least part of the reboil to the distillation column and to produce a mixed vapor-liquid stream, which is returned to the distillation column to provide reflux.

SUMMARY OF THE INVENTION

According to a first aspect, the present invention provides an improvement in a process for separating carbon monoxide from a gaseous mixture containing hydrogen, carbon monoxide and nitrogen comprising partially condensing the mixture to provide a hydrogen-enriched vapor feed fraction and a carbon monoxide-enriched liquid feed fraction; separating nitrogen and carbon monoxide contents of said liquid fraction in a distillation column to provide nitrogen-freed carbon monoxide liquid bottoms and nitrogen-enriched vapor overheads; condensing at least a portion of said overheads; and returning at least a portion of said condensed overheads to said nitrogen-separation column as reflux. The improvement comprises condensing said vapor overheads portion by heat exchange against a recycle heat pump stream derived from said gaseous mixture and containing hydrogen and carbon monoxide.

In a second aspect, the invention provides a corresponding improvement in an apparatus for separating carbon monoxide from a gaseous mixture containing hydrogen, carbon monoxide and nitrogen by a process of the first aspect, said apparatus comprising heat exchange means for partially condensing the gaseous mixture to provide a hydrogen-enriched vapor feed fraction and a carbon monoxide-enriched liquid feed fraction; a distillation column for separating nitrogen and carbon monoxide contents of said liquid fraction to provide nitrogen-freed carbon monoxide liquid bottoms and nitrogen-enriched vapor overheads; heat exchange means for condensing at least a portion of said overheads; and conduit means for returning at least a portion of said condensed overheads to said nitrogen-separation column as reflux. The improvement consists in that there is provided heat pump means for feeding to said heat exchange means a recycle stream derived from said gaseous mixture and containing hydrogen and carbon monoxide.

BRIEF DESCRIPTION OF THE DRAWING

The single FIGURE of the drawing is a process flow diagram for the separation into hydrogen, carbon monoxide and a fuel gas of synthesis gas containing hydrogen, carbon monoxide and methane.

DETAILED DESCRIPTION OF THE INVENTION

According to the present invention, there is provided an improvement in a process for separating carbon monoxide from a gaseous mixture containing hydrogen, carbon monoxide and nitrogen comprising partially condensing the mixture to provide a hydrogen-enriched vapor feed fraction and a nitrogen-containing carbon monoxide-enriched liquid feed fraction;

separating nitrogen and carbon monoxide contents of said liquid fraction in a distillation column to provide nitrogen-freed carbon monoxide liquid bottoms and nitrogen-enriched vapor overheads;

condensing at least a portion of said overheads; and returning at least a portion of said condensed overheads to said nitrogen-separation column as reflux, the improvement consisting in that said vapor overheads portion is condensed by heat exchange against a recycle heat pump stream derived from said gaseous mixture and containing hydrogen and carbon monoxide.

The present invention also provides an improvement in an apparatus for separating carbon monoxide from a gaseous mixture containing hydrogen, carbon monoxide and nitrogen by the process of the invention, said apparatus comprising a heat exchanger for partially condensing the gaseous mixture to provide a hydrogen-enriched vapor feed fraction and a nitrogen-containing carbon monoxide-enriched liquid feed fraction;

a distillation column for separating nitrogen and carbon monoxide contents of said liquid fraction to provide nitrogen-freed carbon monoxide liquid bottoms and nitrogen-enriched vapor overheads;

a heat pump circuit for recycling a heat pump stream;

a heat exchanger for condensing at least a portion of said overheads against said recycle heat pump stream; and a conduit for returning at least a portion of said condensed overheads to said nitrogen-separation column as reflux, the improvement consisting in that the heat pump stream contains hydrogen and carbon monoxide and is derived from said gaseous mixture.

The recycle heat pump stream can be provided by condensation from the hydrogen-enriched vapor feed fraction and/or by separation from the carbon monoxide-enriched liquid feed fraction.

In one preferred embodiment, hydrogen is stripped from the carbon monoxide-enriched liquid feed fraction to provide a vapor fraction containing hydrogen and a hydrogen-freed carbon monoxide liquid fraction; said ($H_2/CO$) vapor fraction is fed to the recycle heat pump stream; and said hydrogen-freed carbon monoxide liquid fraction is fed to the nitrogen-separation column. The hydrogen suitably is stripped in a hydrogen-separation column reboiled by return to said column of a vaporized portion of the hydrogen-freed carbon monoxide liquid fraction.

When the gaseous mixture contains methane, the methane usually will be separated from the carbon monoxide-enriched liquid feed fraction upstream of the nitrogen-separation column. If the process includes the hydrogen stripping step, methane separation is conducted on the hydrogen-freed carbon monoxide liquid fraction. Preferably, methane is separated by distillation in a column refluxed with condensed overheads to provide methane-enriched liquid bottoms and methane-freed vapor overheads. At least part of the methane-freed vapor overheads can be condensed against the recycle heat pump stream. Usually, only part of said condensed methane-freed overheads is returned to the methane-separation column as reflux and the remainder is fed to the nitrogen-separation column.

When, as usual, the methane-containing feed to the methane-separation column is in the vapor phase, it is preferred that said column comprises a stripping section below the feed point of said vapor feed and is reboiled by partially vaporizing and returning, as a two phase mixture, liquid withdrawn from the bottom of said section.

When, as usual, the nitrogen-containing feed to the nitrogen-separation column is in the liquid phase, it is preferred that said column is reboiled by partially vaporizing and returning, as a two phase mixture, liquid withdrawn from below the feed point of said liquid feed.

Preferably, the heat pump includes warming recycle heat pump stream vapor by heat exchange against one or more process streams; compressing the warmed vapor; at least partially condensing the compressed vapor by heat exchange against one or more process streams; and vaporizing the resultant condensed recycle fraction against the condensing vapor overheads from the nitrogen-separation column and, optionally, the methane-separation column (if present) to provide at least a portion of said recycle heat pump stream vapor. When the warmed compressed recycle heat pump stream vapor is only partially condensed, the remaining vapor recycle fraction can be partially condensed against one or more process streams to provide an additional condensed recycle fraction which is separated from the still remaining vapor recycle fraction and warmed against one or more process streams to provide a portion of the recycle heat pump stream vapor. A portion of the still remaining vapor recycle fraction can be added to the additional condensed recycle fraction to control the dew point of said condensed fraction.

The hydrogen-enriched vapor feed fraction can be partially condensed against one or more process streams and the resultant additional condensed feed fraction separated from the resultant remaining vapor feed fraction and added to the additional condensed recycle fraction. An amount of the condensed recycle fraction equal to the amount of the additional condensed feed fraction added thereto can be removed from the recycle heat pump stream and added to the condensed feed fraction derived by partial condensation of the gaseous mixture to maintain the mass balance of said stream.

In order to provide refrigeration requirement for cold box heat leak and warm end temperature difference, a portion of the compressed recycle heat pump stream can be expanded and recycled to the compressor feed.

The following is a description, by way of example only and with reference to the accompanying drawing, of a presently preferred embodiment of the present invention.

Referring to the drawing, synthesis gas 1 produced by partial oxidation of natural gas is supplied at a pressure of 20 to 40 Bara (2–4 MPa; 300–600 psia) and a temperature of 5° C. to 45° C. to a first main heat exchanger H201. The synthesis gas typically contains 44.1 mole percent hydrogen, 55.2 mole percent carbon monoxide, 0.5 mole percent methane and 0.2 mole percent nitrogen. Usually, the synthesis gas will have been conditioned in an upstream adsorber system (not shown) to remove contaminants, such as water and carbon dioxide, which would freeze during the synthesis gas separation.

The feed gas 1 is cooled and partially condensed in a pair of main heat exchangers H201 & H202 to a temperature of about −186° C. and is then fed to a phase separator V201. The condensed fraction feed 3 is fed through a liquid level control valve from the separator V201 for admixture with a portion 7 of condensed $H_2$/CO recycle stream to provide feed 4 to a hydrogen removal column V203. The vapor fraction 5 from the separator V201 is cooled and partially condensed in a Cold End heat exchanger H203 to a temperature of about −202° C. and then fed to a Cold End phase separator V202.

The condensed fraction 6 from the separator V202 is fed through a liquid level control valve to a $H_2$/CO recycle stream 14 from a Cold End recycle phase separator V207 (described later) to form recycle stream 24. An equivalent amount 7 to the condensed fraction 6 is recovered from the liquid fraction 19 of a compressed $H_2$/CO recycle stream 16 separated in a recycle stream phase separator V206 (described later) and fed through a liquid level control valve to the hydrogen removal column V203. Optionally, a portion 9 of the vapor stream 8 from the separator V202 is warmed by passage through the heat exchangers H203, H202 and H201 to provide a hydrogen product stream 10 at a pressure approaching that of the feed gas 1. The remaining portion 11 of the vapor stream 8 is partially warmed in heat exchanger H203 and expanded through a valve 12 to gain J-T refrigeration credit and then mixed with a fuel gas stream 13 from phase separator V207. The valve 12 can be replaced by an expansion machine in order to gain the refrigeration credit. When high pressure hydrogen product stream 10 is not required, the portion 9 of the vapor stream will not be removed and all of the vapor stream can be mixed with the fuel gas stream 13.

The recycle stream 24 is vaporised and warmed in heat exchanger H203 to provide additional cold end refrigeration, mixed with $H_2$/CO recycle vapor stream 25 from the column overhead condenser system (described later) and warmed in heat exchanger H202. An expander outlet stream 18 (described later) is then added to the warmed stream and the total stream 27 is further warmed in heat exchanger H201. This stream at a pressure of about 1.3 Bara (130 kPa; 19 psia) is fed to the suction end of compressor K202, which provides the overall refrigeration balance for the cycle and heat pump duty of the separation columns V203, V204 and V205 (as described later).

The compressor K202 provides a compressed $H_2$/CO recycle stream 15 at a pressure of about 4.8 Bara (480 kPa; 70 psia) and a temperature of about 38° C. The majority of this stream 15 is cooled in heat exchanger H201 to a temperature of about −158° C. but a portion 17 is extracted from the heat exchanger and expanded in expander K201 to provide the overall refrigeration requirement for cold box heat leak and warm end temperature difference. As previously mentioned, the expanded stream 18 (at a temperature of about −160° C.) is recycled to the compressor K202.

The major portion 16 of the compressed recycle stream 15 is further cooled and partially condensed in heat exchanger H202 to a temperature of about −186° C. The vapor and liquid fractions of this recycle stream are separated in phase separator V206. As mentioned previously, a portion 7 of the liquid fraction 19 equivalent to that of the condensed fraction 6 from the Cold End separator V202 is fed with condensed feed stream 3 to the hydrogen removal column V203. The major part 20 of the liquid fraction 19 is fed through a liquid level control valve to thermosyphon pot V209 to provide reflux duties to the $CH_4$/CO separation column V204 and $N_2$/CO separation column V205.

The vapor portion 21 from the separator V206 is further cooled and partially condensed in heat exchanger H203 to a temperature of about −202° C. and then fed to phase separator V207. The condensed fraction 22 is removed through a liquid level control valve and mixed with a portion 23 of the vapor fraction from the separator V207 to provide the recycle stream 14 with which the condensed fraction 6 from separator V202 is mixed to form combined stream 24. The amount of the vapor fraction 23 is such as to provide the combined stream 24 with a temperature of about −204° C. at a pressure of about 1.7 Bara (170 kPa; 25 psia).

The remaining vapor 28 from separator V207 is reduced in pressure to provide a Cold End fuel gas stream 13 which is mixed with the let down hydrogen stream 11 and is warmed in heat exchanger H203. The warm stream is combined with vapor 45 from separator V208 (described later), warmed in heat exchanger H202, and then mixed with bottoms 38 from the $CH_4$/CO separation column V204 to provide combined fuel gas stream 39. This combined stream 39 is warmed in heat exchanger H201 and leaves the separation plant at about 1.9 Bara (190 kPa; 28 psia).

The feed 4 to the hydrogen removal column V203 is essentially liquid and is supplied to the top of the column above structured packing in the column. The column V203 operates at a pressure of about 2.14 Bara (214 kPa; 31 psia)).

As the liquid passes down the column, the hydrogen content is stripped to provide a hydrogen-enriched vapor overhead 26 and an essentially hydrogen-free liquid bottoms 29. The overhead 26 is combined with vapor from the thermosyphon pot V209 to provide part 25 of the feed to the compressor K202. The liquid bottoms 29 is vaporised in heat exchanger H202 and the majority 30 of the resultant vapor fed to the CH$_4$/CO separation column V204. A portion 31 of the vaporised liquid bottoms 29 is returned to the hydrogen removal column V203 to provide reboil to the column.

The vapor feed 30 enters the CH$_4$/CO separation column V204 below a section of sieve trays. This column V204 operates at a pressure of about 2.07 Bara (207 kPa; 30.0 psia). As the vapor passes up through the trays, it is rectified by contact with reflux 32 to remove methane. The overhead 33 from the column V204 is totally condensed in heat exchanger H204 against a H$_2$/CO recycle stream 34 on thermosyphon from pot V209. The majority 35 of the condensed liquid is fed through a liquid level control valve to the N$_2$/CO separation column V205 and the remainder 32 returned to the CH$_4$/CO separation column V204 as reflux.

The CH$_4$/CO separation column V204 has a stripper section below the feed point of the vapor feed 30 to minimise loss of carbon monoxide in the column bottoms. Liquid 36 is collected from the bottom tray of the stripper section, partially vaporised in heat exchanger H202, and returned 37 to the sump of the column V204 to provide reboil to the column. The liquid bottoms 38 are removed from the column V204 through a liquid level control valve and mixed with the combined fuel gas streams 11/13/45 downstream of the heat exchanger H202.

The N$_2$/CO separation column V205 contains sieve trays and the liquid feed 35 enters near the middle of the column. As the liquid passes down the column, the nitrogen content is stripped to provide a nitrogen enriched overhead vapor 43 and a carbon monoxide bottoms product 42. Reboil to the column V205 is provided by partially vaporising in heat exchanger H202 liquid 40 withdrawn from the bottom sieve tray and returning the resultant two phase mixture 41 to the sump of the column V205.

The N$_2$/CO separation column V205 operates at a higher pressure than the CH$_4$/CO separation column V204 and accordingly a static head is maintained in the liquid feed 35 by a stand pipe arrangement on the condensed liquids from heat exchanger H204.

The carbon monoxide product 42 is reduced in pressure through a liquid level control valve, then warmed in the heat exchangers H202 and H201 and supplied to the separation plant battery limit at about 1.3 Bara (130 kPa: 19 psia).

The vapor overhead 43 from column V205 is partially condensed in heat exchanger H204 against the recycle stream 34 on thermosyphon from pot V209 and then fed to a phase separator V208. The condensed portion 44 is returned to the column V205 as reflux and the vapor fraction 45 is mixed with the Cold End fuel gas stream 11/13 and subsequently with the CH$_4$/CO separation column bottoms 38 to provide the fuel gas product 39.

It will be appreciated that the invention is not restricted to the particular details described above and that numerous modifications and variations can be made without departing from the spirit and scope of the invention.

What we claim is:

1. In a process for separating carbon monoxide from a gaseous mixture containing hydrogen, carbon monoxide and nitrogen comprising:
    partially condensing the mixture to provide a hydrogen-enriched vapor feed fraction and a carbon monoxide-enriched liquid feed fraction;
    separating nitrogen and carbon monoxide contents of said liquid fraction in a distillation column to provide nitrogen-freed carbon monoxide liquid bottoms and nitrogen-enriched vapor overheads;
    condensing at least a portion of said overheads; and
    returning at least a portion of said condensed overheads to said nitrogen-separation column as reflux, the improvement consisting in that said vapor overheads portion is condensed by heat exchange against a recycle heat pump stream derived from said gaseous mixture and containing hydrogen and carbon monoxide.

2. The process according to claim 1, wherein the recycle heat pump stream comprises a fraction containing hydrogen and carbon monoxide which is condensed from the hydrogen-enriched vapor feed fraction.

3. The process according to claim 1, wherein the recycle heat pump stream comprises a fraction containing hydrogen and carbon monoxide which is separated from the carbon monoxide-enriched liquid feed fraction.

4. The process according to claim 3, wherein hydrogen is stripped from the carbon monoxide-enriched liquid feed fraction to provide a vapor fraction containing hydrogen and a hydrogen-freed carbon monoxide liquid fraction; said (H$_2$/CO) vapor fraction is fed to the recycle heat pump stream; and said hydrogen-freed carbon monoxide liquid fraction is fed to the nitrogen-separation column.

5. The process according to claim 4, wherein the hydrogen is stripped in a hydrogen-separation column reboiled by return to said column of a vaporized portion of the hydrogen-freed carbon monoxide liquid fraction.

6. The process according to claim 1, wherein the gaseous mixture contains methane and methane is separated from the carbon monoxide-enriched liquid feed fraction upstream of the nitrogen-separation column.

7. The process according to claim 4, wherein the gaseous mixture contains methane and methane is separated from the hydrogen-freed carbon monoxide liquid fraction upstream of the nitrogen-separation column.

8. The process according to claim 1, wherein the gaseous mixture contains methane and the methane content of said liquid feed fraction is separated by distillation in a column refluxed with condensed overheads to provide methane-enriched liquid bottoms and methane-freed vapor overheads.

9. The process according to claim 8, wherein at least part of the methane-freed vapor overheads is condensed against the recycle heat pump stream; part of said condensed methane-freed overheads is returned to the methane-separation column as reflux, and the remainder of said condensed methane-freed overheads is fed to the nitrogen-separation column.

10. The process according to claim 8, wherein the methane-containing feed to the methane-separation column is in the vapor phase; said column comprises a stripping section below the feed point of said vapor feed; and said column is reboiled by partially vaporizing and returning, as a two phase mixture, liquid withdrawn from the bottom of said section.

11. The process according to claim 1, wherein the nitrogen-containing feed to the nitrogen-separation column is in the liquid phase and said column is reboiled by partially vaporizing and returning, as a two phase mixture, liquid withdrawn from below the feed point of said liquid feed.

12. The process according to claim 1, wherein recycle heat pump stream vapor is warmed by heat exchange against one or more process streams; compressed; at least partially condensed by heat exchange against one or more process streams; and the resultant condensed recycle fraction vaporized against the condensing vapor overheads from the nitrogen-separation column and, optionally, a methane-separation column (if present) to provide at least a portion of said recycle heat pump stream vapor.

13. The process according to claim 12, wherein the compressed recycle heat stream is only partially condensed; the resultant vapor recycle fraction is partially condensed against one or more process streams to provide an additional condensed recycle fraction which is separated from the still remaining vapor recycle fraction and warmed against one or more process streams to provide a portion of the recycle heat pump stream vapor.

14. The process according to claim 13, wherein a portion of the remaining vapor recycle fraction is added to the additional condensed recycle fraction to control the temperature of said condensed fraction.

15. The process according to claim 13, wherein the hydrogen-enriched vapor feed fraction is partially condensed against one or more process streams and the resultant additional condensed feed fraction is separated from the resultant remaining vapor feed fraction and added to the additional condensed recycle fraction.

16. The process according to claim 15, wherein an amount of the condensed recycle fraction equal to the amount of the additional condensed feed fraction added thereto is added to the condensed feed fraction derived by partial condensation of the gaseous mixture.

17. The process according to claim 12, wherein a portion of the compressed recycle heat pump stream is expanded and recycled to the compressor feed.

18. A process for separating carbon monoxide from a gaseous mixture containing hydrogen, carbon monoxide, methane and nitrogen comprising:
   partially condensing said mixture to provide a hydrogen-enriched vapor feed fraction and a nitrogen-containing carbon monoxide-enriched liquid feed fraction;
   stripping hydrogen from said liquid feed fraction to provide a vapor fraction containing hydrogen and a hydrogen-freed carbon monoxide liquid fraction;
   separating said hydrogen-freed carbon monoxide liquid fraction in a methane-separation distillation column to provide methane-enriched liquid bottoms and methane-freed vapor overheads;
   separating said methane-freed vapor overheads in a nitrogen-separation distillation column to provide nitrogen-freed carbon monoxide liquid bottoms and nitrogen-enriched vapor overheads;
   condensing at least a portion of said nitrogen-enriched vapor overheads by heat exchange against a recycle heat pump stream containing hydrogen and carbon monoxide and derived from said hydrogen-enriched vapor feed fraction; and
   returning at least a portion of said condensed overheads to said nitrogen-separation column as reflux.

19. The process according to claim 18 wherein said heat pump stream comprises said vapor fraction from the hydrogen tripping step.

20. The process according to claim 19, wherein at least part of the methane-freed vapor overheads is condensed against the recycle heat pump stream; part of said condensed methane-freed overheads is returned to the methane-separation column as reflux, and the remainder of said condensed methane-freed overheads is fed to the nitrogen-separation column.

21. The process according to claim 20, wherein recycle heat pump stream vapor is warmed by heat exchange against one or more process streams; compressed; at least partially condensed by heat exchange against one or more process streams; and the resultant condensed recycle fraction vaporized against the condensing vapor overheads from the nitrogen-separation column and from the methane-separation column to provide at least a portion of said recycle heat pump stream vapor.

22. In an apparatus for separating carbon monoxide from a gaseous mixture containing hydrogen, carbon monoxide and nitrogen by the process of claim 1, said apparatus comprising:
   a heat exchanger for partially condensing the gaseous mixture to provide a hydrogen-enriched vapor feed fraction and a nitrogen-containing carbon monoxide-enriched liquid feed fraction;
   a distillation column for separating nitrogen and carbon monoxide contents of said liquid fraction to provide nitrogen-freed carbon monoxide liquid bottoms and nitrogen-enriched vapor overheads;
   a heat pump circuit for recycling a heat pump stream;
   a heat exchanger for condensing at least a portion of said overheads against said recycle heat pump stream; and
   a conduit for returning at least a portion of said condensed overheads to said nitrogen-separation column as reflux,
the improvement consisting in that the heat pump stream contains hydrogen and carbon monoxide and is derived from said gaseous mixture.

23. An apparatus for separating carbon monoxide from a gaseous mixture containing hydrogen, carbon monoxide, methane and nitrogen by the process of claim 18, said apparatus comprising:
   a heat exchanger for partially condensing the gaseous mixture to provide a hydrogen-enriched vapor feed fraction and a nitrogen-containing carbon monoxide-enriched liquid feed fraction;
   a stripping column for stripping hydrogen from said liquid feed fraction to provide a vapor fraction containing hydrogen and a hydrogen-freed carbon monoxide liquid fraction;
   a methane-separation distillation column for separating said hydrogen-freed carbon monoxide liquid fraction to provide methane-enriched liquid bottoms and methane-freed vapor overheads;
   a nitrogen-separation distillation column for separating said methane-freed vapor overheads to provide nitrogen-freed carbon monoxide liquid bottoms and nitrogen-enriched vapor overheads;
   a heat pump circuit for recycling a heat pump stream containing hydrogen and carbon monoxide and derived from said hydrogen-enriched vapor feed fraction;
   a heat exchanger for condensing at least a portion of said nitrogen-enriched vapor overheads against said recycle heat pump stream; and
   a conduit for returning at least a portion of said condensed overheads to said nitrogen-separation column as reflux.

* * * * *